July 10, 1956 R. W. BURTON 2,753,848
FLUID POWER STEERING

Filed May 21, 1954 2 Sheets-Sheet 1

Inventor
Robert W. Burton
By
C. F. Dilke
Attorney

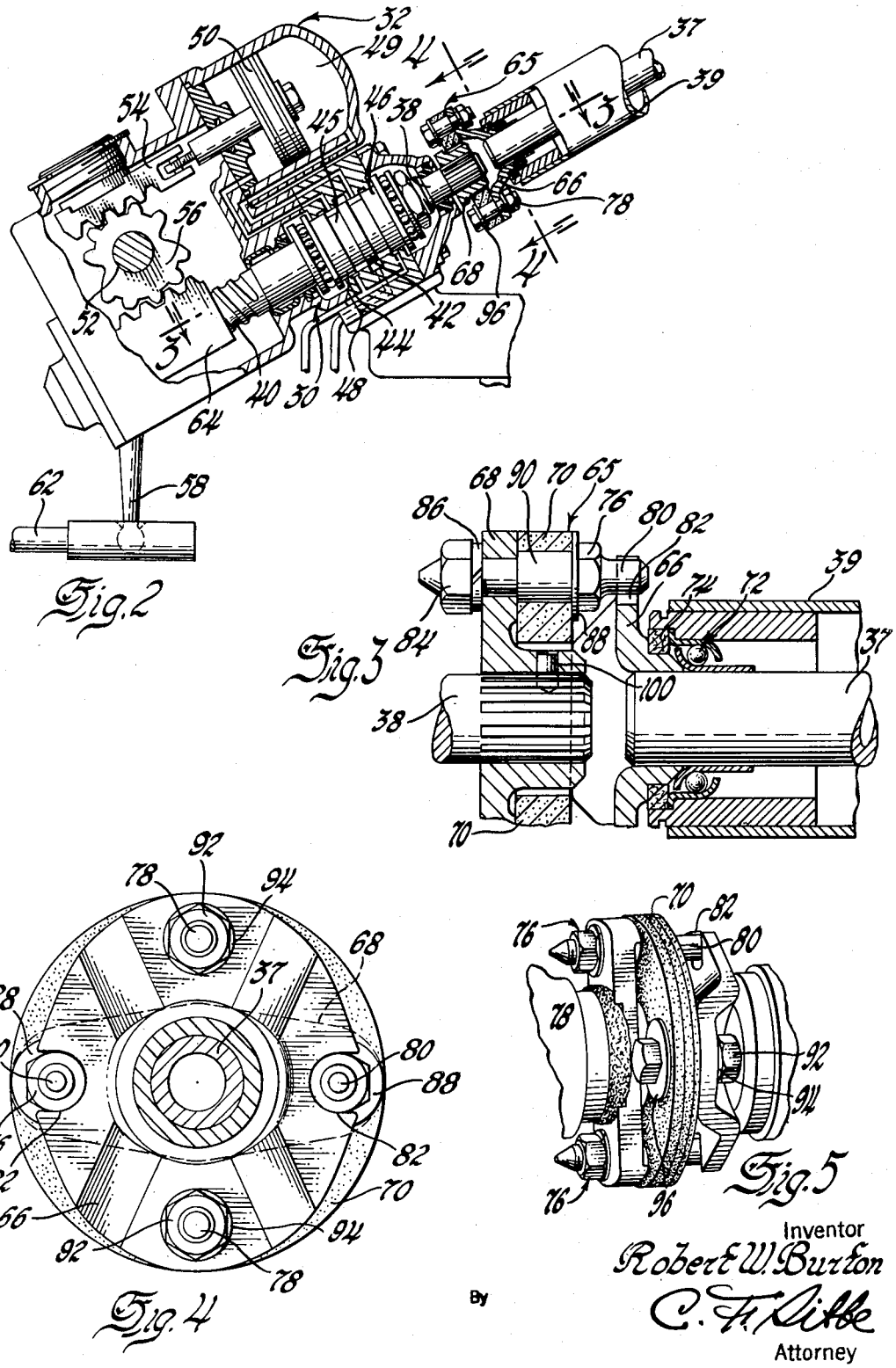

United States Patent Office 2,753,848
Patented July 10, 1956

2,753,848

FLUID POWER STEERING

Robert W. Burton, Farmington, Mich., assignor to General Motors Corporation, Detroit, Mich., a corporation of Delaware Application May 21, 1954, Serial No. 431,390

3 Claims. (Cl. 121—38)

This invention relates to the power steering of automotive vehicles and the like and more especially concerns a fluid power steering system utilizing a bipartite steering shaft in which the two shaft sections are interconnected via a flexible coupling functional with relation to the control valve component of the system. In its most particular aspect, the invention represents an improvement over the hydraulically operated power steering gear representing the subject matter of Davis Patent 2,213,271 granted September 3, 1940. Such gear is particularly distinguished in that actuation of the control valve, which is associated with the steering shaft, is effected by reactionary thrust transmitted from the steering wheels through the steering linkage and gear box to the shaft.

The apparatus shown in the identified prior patent has worked well in practice, but there has been considerable criticism from some quarters directed to the noises which are inherent in its operation. These noises are of two categories—hydraulic and mechanical. The former, which are manifest as hissing sounds, owe to the rapid passage of the pressure fluid through the relatively restricted channels and conduits in the control valve, while the mechanical noises, in the nature of rattles or chuckles, stem from reciprocation of the moving element of the valve due to road shock.

The present invention has as its principal object to provide means whereby the aforementioned undesirable noises are isolated to the extent that they are either not heard or pass unnoticed in the driver's compartment of the vehicle.

A further object is to provide in association with the means effecting the noise insulation, means precluding transmission of reactionary thrust to the steering wheel of the vehicle.

Other objects and features of the invention will be apparent from the following description addressed to a preferred embodiment thereof. The description will proceed with reference to the accompanying drawings in which:

Figure 2 shows the principal parts of the power steering gear in longitudinal section;

Figure 3 is a section through the coupling means whereby the steering shaft sections are joined, the section being taken at right angles to the section of Figure 3;

Figure 4 is a view on the line 4—4 in Figure 2; and

Figure 5 is a perspective view of the coupling means.

Figure 1:
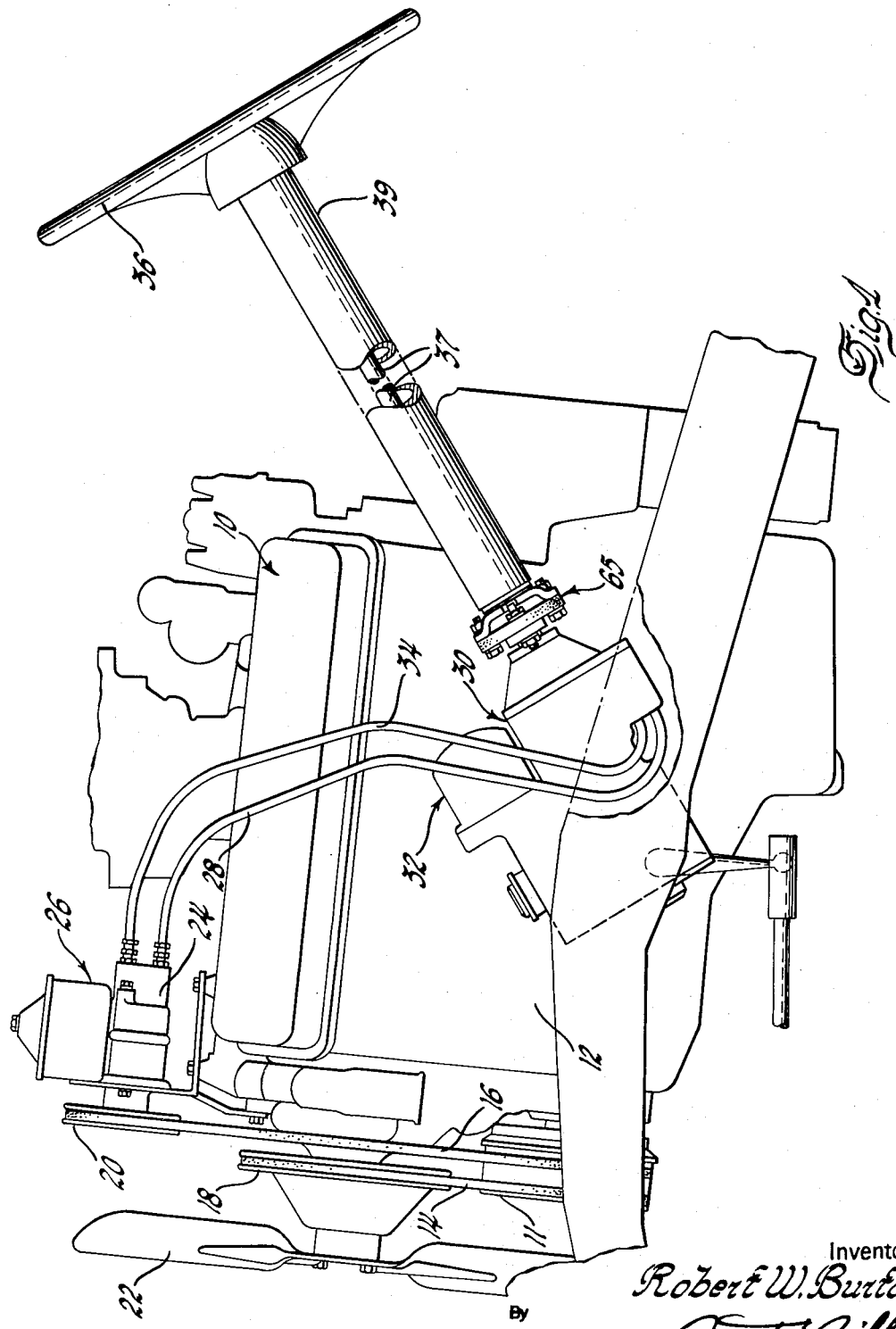
Figure 1 shows a typical installation in side elevation.

Referring first to Figure 1, the numeral 10 indicates an internal combustion engine, the crankshaft of which mounts a double pulley 11 forward of the cylinder block 12. Pulley 11 is interconnected via belts 14 and 16, respectively, with pulleys 18 and 20, respectively, so as to drive a cooling fan 22 and a pump 24 serving the power steering mechanism.

Pump 24 will be seen as mounting a reservoir 26 from which the pump draws. The pump discharge is conveyed via a line 28 to a valve 30 controlling the flow of the pressure fluid, normally a mineral oil of suitable viscosity characteristics, to and from a fluid motor 32. Exhaust fluid is returned to the reservoir via line 34.

Valve 30 is of the open center spool type and includes a central land 42 (Figure 2) functional with respect to the inlet porting and a pair of end lands 44, 46 functional with respect to the exhaust or outlet porting. For a full and complete description of the valve structure, reference is made to co-pending application Serial No. 388,858, filed October 28, 1953. Suffice it to say here, that with the valve spool centered in the valve housing 48 and with the engine of the vehicle running, the fluid from the pump is continuously circulated through the valve against the static pressure of the fluid in the motor 32. In its right turn position, the spool, which is part and parcel of the lower steering shaft section 38, terminating in a worm 40, is displaced downwardly so that a pressure differential is created in the fluid motor 32 in favor of the right hand chamber 49 of the motor. Conversely, in its left turn position the spool is displaced axially upwardly so as to create a pressure differential in favor of the opposing chamber of the motor.

Movement of the piston 50 is transmitted to the drag link 62 via a rack 54 mating with the upper sector of a double sector gear 56 fixed to the rockshaft 52, in turn fixed to the pitman arm 58. The lower sector of the double sector gear 56 mates with a ball nut 64 which moves up or down on the worm 40 depending on the direction of rotation of the steering wheel 36 (Figure 1), fixed at the upper end of the steering shaft section 37 within the steering column or mast jacket 39. Ball nuts such as 64 are conventional in the art and need not be described in any detail here. Drag link 62 may interconnect with the dirigible wheels of the vehicle through any suitable linkage arrangement.

Reverting to the valve 30, it should be noted that in the usual construction the same comprises means tending to maintain the spool 45 centered in the housing 48. Conventionally, these means (see U. S. 2,213,271) include a plurality of spring-plunger sets, not shown, spaced around the spool, the springs being so preloaded that, say from three to eight pounds of effort is required at the steering wheel before displacement of the spool is possible. An advantage of such an arrangement resides in the fact that it provides a steering "feel" which would otherwise be lacking. Assuming springs of a six pound preloading, for example, the steering at normal highway cruising speeds may be entirely manual, the steering resistance at such speeds generally being less than the indicated value. When the steering resistance exceeds the spring preloading, as during parking, the rotation of the shaft section 38 will be accompanied by reactionary axial movement of the shaft section with displacement of the valve spool, the axial movement, as previously indicated, being downward in the case of a right turn and upward in the case of a left turn.

In accordance with the invention, the rotary movement of the upper steering shaft section 37 is transmitted to the lower shaft section 38 carrying the worm 40, through a flexible coupling indicated at 65. In general, this coupling consists of a pair of flanges 66 and 68 with a disk 70 of rubberized or elastomerized fabric or paper therebetween. It has been found that the material sold under the trademark "Frabreeka" by the Frabreeka Products Company, Boston, Massachusetts, is particularly well adapted for use in the fabrication of the disc, but no limitation thereto is intended.

Shaft section 38 will be noted (Figure 3) as having a spline connection with the flange 68. However, relative axial movement as between the shaft and flange is not possible in view of the pin 100.

Steering shaft section 37, which is held against axial movement by means not shown, is fixedly secured to the corresponding flange 66, as by welding or in any other suitable manner and turns in a roller bearing 72 adjacent the flange. A sealing ring 74 prevents the escape of lubricating fluid.

Flange 66 will be seen as having a more or less circular conformation, while flange 68 is generally bar-like in form (Figures 4 and 5). These flanges are inter-linked through bolts 76, the heads of which have boss portions 80 received in slots 82 formed in the flange 66. Nuts 84 are held secure by lock washers 86 while reinforcing pieces 88 distribute the pressure of the bolt heads over a substantial area of the face of the disc 70. The shank of each of the bolts is stepped, the portion 90 of largest diameter being coextensive with the thickness of the disc material.

In addition to bolts 76, the coupling comprises bolts 78 joining flange 66 to the disc 70. Bolts 78, like bolts 76 have stepped shanks, with the portions of larger diameter encircled by the material of the disc. Elements 96 are functionally identical to elements 88. Flange 66 is recessed in the areas of the nuts 92 which are held against loosening by lock washers 94.

From the foregoing it should be clear that whereas the connectors represented by bolts 78, the associated washers and nuts, operate only to secure the disc 70 to the flange 66, the connectors represented by bolts 76 and the associated parts in addition to securing the disc to the flange 68, by reason of the bosses 80 accommodated in the slots 82 provide a direct rotary driving connection between the flanges. With the arrangement as illustrated and described, the steering wheel rides with the driver's compartment, so to speak, while the valve 30 rides with the chassis, so that shocks and vibrations tending to cause chattering of the valve are effectively insulated from the wheel. Additionally, the disc material effectively insulates the hydraulic noises heretofore transmitted to the driver's compartment via the steering shaft.

A further and equally important advantage of the invention goes to the fact that the reactionary axial movement of the shaft 38 bringing about actuation of the control valve is not transmitted to the upper shaft section. Thus, as best seen from Figure 5, taken in conjunction with Figure 4, such movement of the shaft 38, whether downward or upward, instead of bringing about corresponding movement of the shaft 37 is marked by flexing of the disc 70 and axial movement of the bosses 80 in the slots 82.

Having thus described and illustrated my invention, what I claim is:

1. Steering apparatus including a steering shaft having an upper section and a lower section, the latter being supported for limited axial movement, a fluid motor adapted for operative connection with a steering member and a control valve for said motor having a part connected to said lower shaft section and adapted to be actuated on reactionary axial movement of said lower shaft section, said shaft sections being joined through a coupling serving to substantially mitigate the transmission to the upper shaft section of noises and vibrations originating incident to relative movement of the valve parts and to absorb the said reactionary axial movement of the lower shaft section thereby to prevent impartation of axial movement to said upper shaft section, said coupling comprising a flexible member disposed between a flange carried by said upper shaft section and a flange carried by said lower shaft section and further comprising a pair of connectors, one of which secures said flexible member to one of said flanges, the other which secures together the other of said flanges and said flexible member and includes means providing a direct rotary driving connection between said flanges.

2. Steering apparatus including a steering shaft having an upper section and a lower section, the latter being supported for limited axial movement, a fluid motor adapted for operative connection with a steering member and a control valve for said motor having a part connected to said lower shaft section and adapted to be actuated on reactionary axial movement of said lower shaft section, said shaft sections being joined through a coupling serving to substantially mitigate the transmission to the upper shaft section of noises and vibrations originating incident to relative movement of the valve parts and to absorb the said reactionary movement of the lower shaft section thereby to prevent impartation of axial movement to said upper shaft section, said coupling comprising a disc of rubberized fiber composition disposed between a flange carried by said upper shaft section and a flange carried by said lower shaft section and further comprising a pair of connectors one of which secures said disc to one of said flanges, the other of which secures together the other of said flanges and said disc and includes means providing a direct rotary driving connection between said flanges, said last means having the form of a boss accommodated by a slot in the opposed flange.

3. In combination with power steering apparatus including a fluid motor adapted for operative connection with a steering member and a control valve for said motor, a steering shaft having an upper section and a lower section, the latter being connected to a part of said valve, said shaft sections being joined through a coupling permitting limited axial movement of the lower of said sections relative to the upper and adapted to substantially mitigate the transmission to the upper shaft section of noises and vibrations originating incident to relative movement of components of said valve, said coupling comprising a flexible member disposed between a flange carried by said upper shaft section and a flange carried by said lower shaft section and further comprising a pair of connectors, one of which secures said flexible member to one of said flanges, the other of which secures together the other of said flanges and said flexible member and includes means providing a direct rotary driving connection between said flanges.

References Cited in the file of this patent

UNITED STATES PATENTS

| | | |
|---|---|---|
| 1,409,611 | Stokes | Mar. 14, 1922 |
| 2,213,271 | Davis | Sept. 3, 1940 |
| 2,226,656 | Best | Dec. 31, 1940 |
| 2,272,900 | Saurer | Feb. 10, 1942 |